United States Patent

[11] 3,630,444

[72] Inventor Walter Raymond Nelson
  Louisville, Ky.
[21] Appl. No. 24,246
[22] Filed Mar. 31, 1970
[45] Patented Dec. 28, 1971
[73] Assignee American Standard Inc.
  New York, N.Y.

[54] TRAJECTORY FLOW CONTROL APPARATUS
  8 Claims, 8 Drawing Figs.
[52] U.S. Cl.................................................. 239/29,
  137/504, 138/46, 239/534, 239/572, 239/590.3,
  239/590.5
[51] Int. Cl...................................................... E03b 9/20
[50] Field of Search............................................ 239/24, 28,
  25, 29, 452, 534, 535, 546, 553.5, 562, 569, 570,
  575, 590, 590.3, 602, 428.5; 137/495, 504, 513.5;
  138/42, 43, 45, 46

[56] References Cited
  UNITED STATES PATENTS
2,878,836  3/1959  Binks............................ 138/45
2,541,854  2/1951  Bachli et al.................... 239/428.5
2,793,016  5/1957  Aghnides....................... 239/428.5
3,334,818  8/1967  Moen........................... 239/428.5
3,239,152  3/1966  Bachli et al.................... 239/575 X
3,288,376  11/1966 Lovell.......................... 239/428.5
3,321,140  5/1967  Parkison et al................. 239/590.3
3,006,378  10/1961 Erickson et al................. 138/46

3,138,177  6/1964  Cutler.......................... 137/504 X
3,343,566  9/1967  Luckenbill..................... 138/43

Primary Examiner—M. Henson Wood, Jr.
Assistant Examiner—Michael Y. Mar
Attorneys—Jefferson Ehrlich, Tennes I. Erstad and Robert G. Crooks ABSTRACT: Covers a spout or a spout end which produces a trajectory stream, i.e., an upwardly directed stream, that is smooth and substantially splashless at normal fluid flow rates notwithstanding changes in the pressure of the fluid traversing the structure. The structure maintains the trajectory stream substantially smooth considerable splashless without the usual or conventional pressure regulator. The volume and path of the water can be maintained over an assigned trajectory path within a basin or lavatory.

The spout end includes a fluid control device consisting of two tandem arranged disks, one made of rubber and flexible, the other being a rigid disk made of plastic or metal. Structurally, the first disk includes a plurality of substantially identical cylindrical parallel apertures together with a considerable number of flexible projections. The second disk includes a greater number of substantially identical but smaller cylindrical parallel apertures.

In addition to the two-disk structure, the mechanism also includes a conical disk upstream of the fluid control device, a plurality of flat screens downstream of the fluid control device, and a plurality of spherical or concaval screens downstream of the flat screens.

Patented Dec. 28, 1971
3,630,444
3 Sheets-Sheet 1
FIG.1
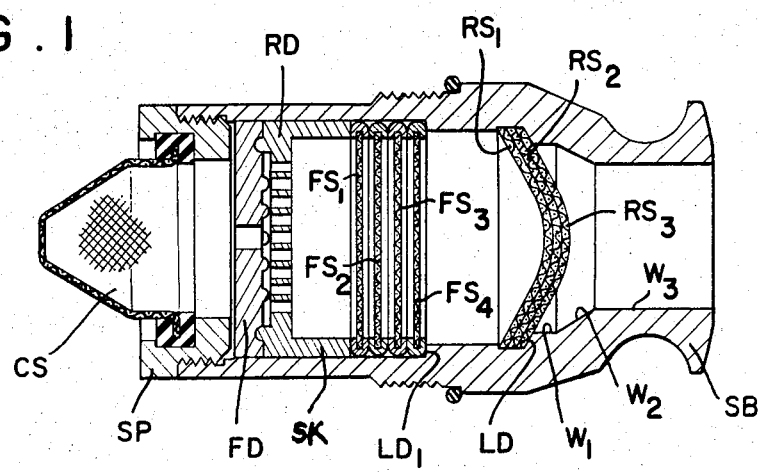
FIG.2
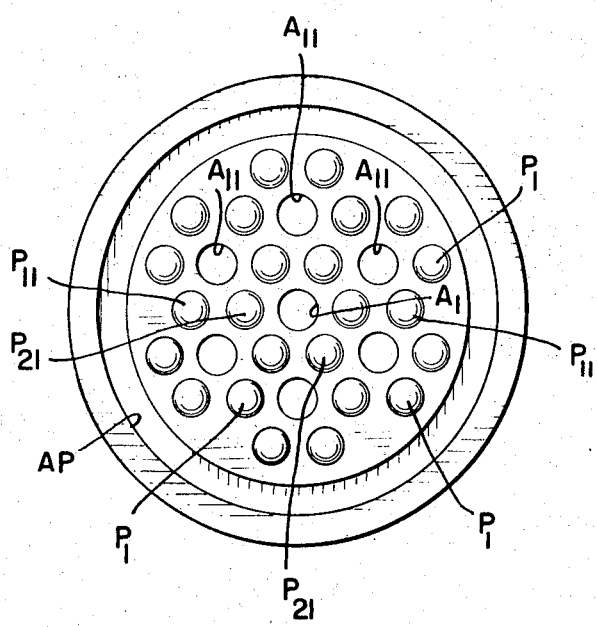
FIG.3
INVENTOR.
WALTER R. NELSON
BY Jefferson Ehrlich
ATTORNEY Patented Dec. 28, 1971
3,630,444
3 Sheets-Sheet 2
FIG.4
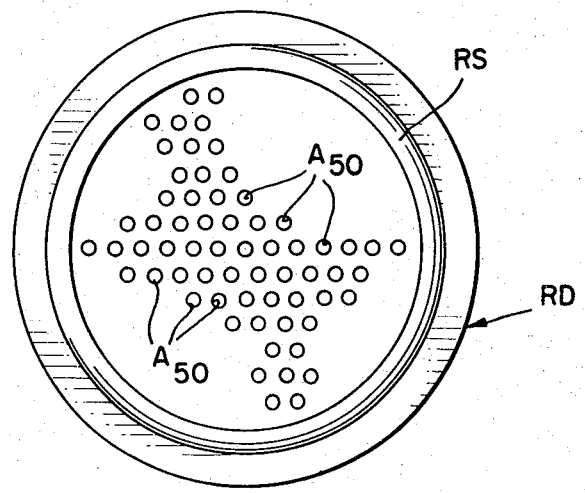
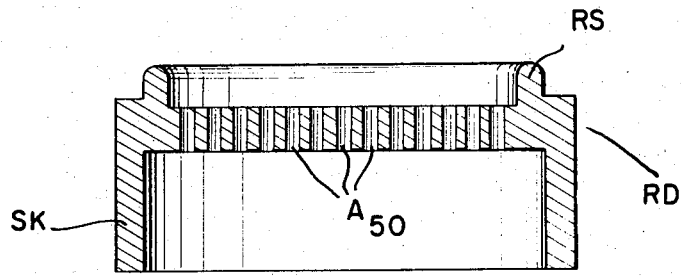
FIG.5
INVENTOR.
WALTER R. NELSON
BY Jefferson Ehrlich
ATTORNEY Patented Dec. 28, 1971

INVENTOR.
WALTER R. NELSON
BY Jefferson Ehrlich
ATTORNEY

TRAJECTORY FLOW CONTROL APPARATUS This invention relates to spouts and spout ends for producing trajectory streams and, more especially, to such structures for producing a coordinated laminar upwardly directed stream of fluid suitable for a plumbing fixture such as a drinking fountain. Still more particularly, this invention relates to spouts and spout ends for generating a laminar substantially uniform trajectory stream which is smooth and substantially splashless and remains smooth and substantially splashless while the stream travels over its assigned path, notwithstanding substantially large variations in the pressure of the fluid supplied to the spout or spout ends.

In many types of spouts or spout ends for plumbing fixtures, such as drinking fountains, where a trajectory path is required for the stream, it is highly desirable to maintain a relatively unrestricted flow of fluid when the pressure behind the fluid is at about a predetermined level and to relatively restrict the flow to the structure so that the volume of the fluid flowing through the structure will remain at a substantially constant level as the pressure rises to higher levels or varies considerably or rapidly above the predetermined level. In order to prevent changes in the length of the trajectory stream as the pressure changes from time to time, it has been customary to provide a conventional pressure regulator. Such a pressure regulator is rather large and bulky and is located upstream of the spout or spout end. The conventional pressure regulator is designed to respond to changes in the pressure of the fluid traveling through the interconnected conduit, seeking at all times to maintain the fluid flow through the structure at a substantially constant level.

Such conventional pressure regulators are, however, expensive and complicated and, because they are located ofttimes remote from the spout or spout end, they are difficult to service and sometimes servicing becomes virtually impossible.

It is, therefore, one of the main objectives of this invention to provide a structure for a spout or spout end which will be normally inert or inactive as the pressure level of the incoming fluid is relatively low, that is, at or about a predetermined level, and which will respond promptly and positively to restrict the flow through the structure to a substantially constant level when the pressure of the incoming fluid rises above said predetermined level. Such a structure is especially valuable for spouts and spout ends which are designed for drinking purposes in basins or lavatories.

The type of structure to which this invention relates, as already suggested, may be used in a spout or a spout end for a plumbing fixture supplying water for drinking purposes from a conventional or city water supply system which may vary in pressure over a rather wide range due to changes in the supply or demand for water. By the use of the present invention, the spout or spout end structure of this invention will allow the water flowing through the equipment to flow over a substantially uniform trajectory path notwithstanding substantially large changes in the pressure of the water entering the equipment. The flow of water through the spout or spout end will remain substantially constant as the incoming pressure is, let's say, at or near a predetermined level of 30 p.s.i., the water emitted through the spout or spout end remaining substantially constant at the same volume even though the inlet fluid pressure changes over rather wide ranges above the 30 p.s.i. level.

One of the key or essential components of the structure of this invention includes two tandem disk-shaped devices, one made of a flexible material, such as rubber, and the other made of a rigid material, such as metal or plastic. These two disk-shaped members are positioned and maintained closely adjacent and parallel to each other in the flow path. The flexible member is located upstream of the rigid member. According to one form of the invention, the flexible member may employ a plurality of identical perforations which may be, for example, cylindrical while the downstream side of the same flexible member has, in addition, a plurality of projecting flexible elements constituting projections extending downstream. The tandem downstream rigid disk-shaped member includes a large number of smaller identical apertures, for example, 120 in number. When the two disks are placed closely adjacent and parallel to each other, the flexible projection elements barely touch the adjacent surface of the rigid disk when the fluid pressure is normal or predetermined. The flexible disk will be pressed against the rigid disk when the fluid pressure rises above the predetermined value. The projections on the flexible disk become distorted in shape and restrict the net or overall fluid path through the structure.

Thus, when water flows through the two tandem arranged disks and the pressure is, for example, at a predetermined value around 30 p.s.i., the fluid will pass normally through the two disks traversing the various openings of both disks. The rate of flow will be substantially unchanged by the presence of the two disks at this predetermined pressure level or at somewhat lower levels. However, as the pressure of the incoming water rises above the predetermined level, for example, above 30 p.s.i., then the increased pressure on the flexible disk will drive the projections on the flexible disk firmly against the upstream surface of the rigid adjacent disk. As the projections become flattened as the fluid passageways between the projections decrease, and as the spacing between the edges of the apertures in the flexible disk and the rigid disk decrease, the flow through the structure will be promptly adjusted to the increased pressure. Moreover, the flattened projections will cover an increasing number of apertures in the rigid disks. Hence, the net effect of the flattening of the projections and the distortions of the flexible disk caused by an increase in the applied pressure results in a total reduction in the relative size of the fluid passageway, whereby the flow of water through the combination of the two disks will be substantially reduced to the fixed or predetermined level. Furthermore, as the pressure increases higher and higher to, let's say 50, 100, 150 p.s.i., the flow stream through the two disks will respond to the increased pressure and the pattern of the flow stream will remain substantially unchanged. Thus, the rate of fluid flow (gallons of water per minute) delivered by the pair of tandem disks will remain substantially unchanged notwithstanding the increased or varying pressures applied to the incoming water in rising or varying above the predetermined level.

As will be more clearly explained hereinafter, the control mechanism comprising the two disks above referred to is combined with a frustoconical screen located upstream of the dual disk structure. The frustoconical screen may have an apex angle of around 60°. The apex of the frustoconical screen is furthest removed from the dual disks and its axis is substantially coincident with the flow path through the structure. Moreover, the dual disks are followed by a series of flat parallel closely adjacent screens held within cylindrical holders, which may be four in number, and these in turn are followed by three screens which are in contact with each other. The latter screens are spherical or concaval in shape. The latter screens are positioned against a ledge so that they are retained in a fixed position within the spout end structure at all times, regardless of the magnitude of the pressure of the fluid flowing through the structure.

This invention and its objects and features will be better and more clearly understood from the more detailed description and explanation hereinafter following when read in connection with the accompanying drawing, in which FIG. 1 shows a cross-sectional view of a spout end structure generally conforming to the invention and capable of producing a trajectory path for the fluid traversing the structure and having the proper angular position;

FIG. 2 illustrates a plan view of one form of the flexible disk of this invention;

FIG. 3 illustrates a cross-sectional view taken along the horizontal centerline of the flexible disk of FIG. 2;

FIG. 4 illustrates a plan view of the rigid disk that may be employed in this invention;

FIG. 5 illustrates a horizontal cross-sectional view taken along the centerline of the rigid disk of FIG. 4;

The same or similar reference characters will be employed to designate the same or similar parts wherever they occur throughout the drawing.

Figure 6:
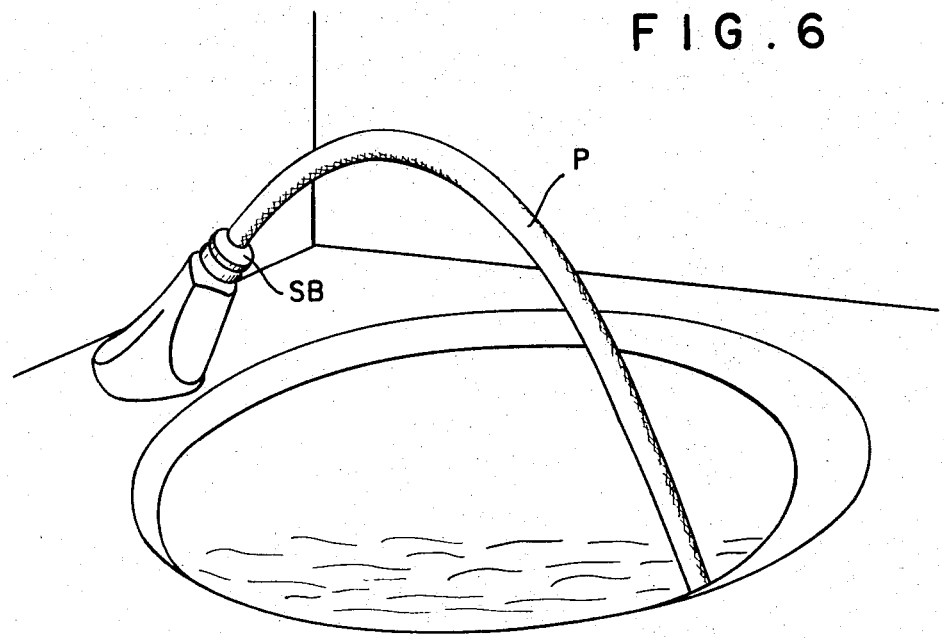
FIG. 6 illustrates a perspective of a lavatory employing the upwardly directed trajectory spout equipment of this invention and especially illustrating its smooth fluid trajectory path.

Referring especially to FIG. 1 of the drawing, one form of the spout end structure of this invention is shown in cross section. It includes a housing or spout body SB and a spout end plug SP, both of which are joined together by appropriate threading, as shown. The spout body SB includes two peripheral ledges LD1 and LD2. The ledge LD1 supports four screens FS1, FS2, FS3 and FS4 which are substantially flat and parallel and closely adjacent to each other. The ledge LD2 supports three semispherical or concaval screens RS1, RS2 and RS3. It will be observed that the second ledge LD2 is followed by a cylindrical wall W1 which, in turn, is followed by a tapered or frustoconical wall W2, and this is followed by another cylindrical wall W3 or smaller diameter which constitutes the mouth of the spout body SB.

Each of the four flat screens FS1 to FS4 is retained within its own conventional cylindrical holder for holding the screen in position therein and each holder provides predetermined separation between adjacent screens. Immediately upstream of the screen FS1, there is located the rigid disk RD, which is shown in greater detail in FIGS. 4 and 5. The rigid disk RD is adjacent to the flexible disk FD, which is shown in greater detail in FIGS. 2 and 3. The flexible disk is retained by plug sp which also supports a frustoconical screen CS, as shown. The screen CS may have an apex angle of about 60°, with its apparent apex positioned upstream of the flexible disk FD. The frustoconical screen CS may be mounted in a plug as shown and serves as a filter or strainer, designed primarily to eliminate or divert foreign matter before such matter reaches any of the remaining components within the spout body SB and thereby interferes with its proper or intended operation.

As shown in FIGS. 2 and 3, the flexible disk FD includes a plurality of apertures which are substantially cylindrical in shape and parallel to each other. The central aperture is designated A1 and it is surrounded by six additional peripheral apertures each designated A11 which are equally spaced from each other and from the central aperture A1. The flexible disk FD also includes a multiplicity of projections which, as shown in the drawing, may be divided into three tiers. The projections of the outer tier are designated P1, the projections of the intermediate tier are designated P11, while the projections of the innermost tier are designated P21. Each of the apertures, such as A11, is surrounded by a group of satellite projections, six in number as shown. Each of the projections P1, P11, and P21, may be semispherical in shape as shown. Obviously, the number of apertures and their shapes and the number of projections and their shapes may be changed, as desired, within the scope of this invention.

The rigid disk RD, shown more clearly in FIGS. 4 and 5, embodies a larger number of apertures each designated A50, each of which may be cylindrical in shape. The diameter of each of these apertures A50 is smaller than the diameter of the apertures A1, A11, and A21 of the flexible disk FD. The rigid disk RD also embodies a so-called retaining seat RS for seating the flexible disk FD. The retaining seat RS, which is circular in shape, is designed to receive the peripheral rim AP of the flexible disk FD, as shown more clearly in FIG. 1. The rigid disk RD also embodies a skirt SK which, in the longitudinal direction, may be of any desired length. The number of apertures in the rigid disk RD and their shape may be changed as desired.

It will be observed from FIG. 1 that the ends of the projections P of the flexible disk FD are adjacent to and barely touch the adjacent back or upstream surface of the rigid disk RD. This is the normal position of projections P. However, as the pressure of water entering the spout end changes, i.e., increases, the flow of water through the spout end will remain substantially constant in accordance with this invention. As the water pressure rises above a predetermined level, such as 30 p.s.i., the several projections P of the flexible disk FD will be depressed, bent or distorted and will exert an influence upon the flexible disk FD and upon the apertures of the rigid disk RD and also upon the sizes and the number of openings in the rigid disk RD. The net result of this change will be that the area of the fluid passageways will be restricted and reduced in size in proportion to the excess of fluid pressure exerted against the flexible disk FD.

If the fluid pressure is at or somewhat below the predetermined level, the amount of deflection of the flexible disk FD will be zero, perhaps even completely negligible. Hence, the volume of water traversing the structure will be relatively undiminished. The water flow through the structure will remain at about the same volume even if the flow through the structure were suddenly started or changed by a quick change in the water pressure from a low or negligible value to a relatively high value. The response time is very small. This is quite important in any practical trajectory system.

As the fluid pressure rises above the predetermined value of, for example, 30 p.s.i., the volume of fluid flow will be substantially uniform notwithstanding the increased pressure applied against the adjacent upstream side of the flexible disk FD. The size of the pressure increases will change the shape of the projections P of the flexible disk, as already suggested, depressing and deforming them more and more as the pressure rises. The net result of the increased fluid pressure will be, not only to reduce the spacing between the center of the flexible disk FD and the rigid disk RD, but also to reduce the exposed or transmission area of the apertures A50 of the rigid disk RD. This will serve to maintain the fluid flow rather constant under these enhanced pressurized conditions.

The flow control structure, including the two disks such as FD and RD, is shown and described in a copending application of R. G. Parkison, filed of even date herewith and assigned to the assignee of the present application.

Although shown and described as separate disks, the disks FD and RD may be joined together as a unitary structure, if desired. Furthermore, the disk FD may also be a rigid structure having flexible projections or other appendages which become distorted to modify the net area of the flow path.

It will be observed from FIG. 1 that the flexible disk FD and the rigid disk RD are followed by the four screens FS1 to FS4 which are retained by the skirt SK of the rigid disk RD and against the ledge LDI. The meshes of the several screens are preferably aligned in different or nonparallel positions.

The screens RS1, RS2 and RS3 are curved screens, preferably spherically or concavally oriented about their common axis which coincides with the axis of the spout end. The screens may be flat screens which may be inserted into the spout body SB by being physically pressed into their spherical or concaval shape in the body SB. However, they may alternatively be preformed to their desired or indicated shape. The meshes of these curved screens are preferably oriented at different angles with respect to each other, perhaps 30° apart. In any event, the curved screens RS1 to RS3 are physically retained in their position against ledge LD2 by the pressurized fluid and their position will not be changed after they are assembled in the body SB. These curved screens may be made of metal, such as bronze, brass, etc., but plastic screens may also be used if desired. As already suggested, parallel orientations of any of the screens of the structure should be avoided.

FIG. 6 shows a perspective of the upwardly directed trajectory stream produced by the spout end structure of this invention. The flow path of the stream is shown as substantially smooth and nonturbulent. Splashing against the wall of the basin would be minimal or substantially nonexistent. This is due primarily to the fact that the flow path P of the stream will be substantially unchanged notwithstanding the various changes, whether rapid or not, that occur in the pressure of the fluid supplied to the spout body SB. In other words, even during rather large and sudden changes in the pressure of the water supplied to the structure, the flow path P will remain unchanged. The path pattern is shown in FIG. 6 as glasslike in appearance and quite attractive.

Figure 7:
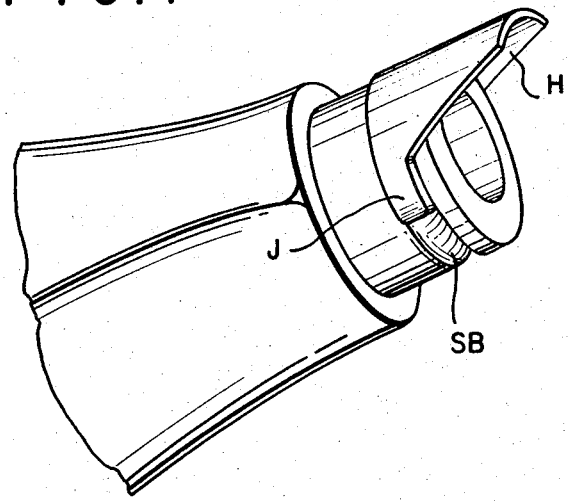
FIG. 7 shows a perspective of a hooded spout arrangement which may be especially suitable for the structure of this invention.
Figure 8:
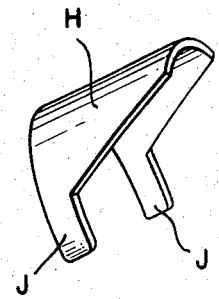
FIG. 8 shows a perspective of the hood suitable for the spout structure of this invention.

FIG. 7 and FIG. 8 show a protective hood H for the spout structure. It is shaped so as to embody two jaws J,J so that the hood H may be clipped on or affixed to the body of the spout structure, as especially shown in FIG. 7. The protective hood may be made of plastic or of other material. It is preferably made of an elastic or semielastic material so that it may be easily snapped over the outer surface of the body SB. The hood H is, therefore, easily applied or removed whenever desired. The hood H is naturally optional; it is not required for the operation of the spout structure.

It will be observed that the internal configuration of the spout body SB is contoured so that the fluid stream will be urged and pointed generally toward the existing axis of the spout body SB. The internal wall is tapered or stepped to a reduced diameter by the ledges LD1 and LD2 and the tapered wall such as W2 of the structure. This contour promotes the production of a laminar flow path for the fluid traversing the structure.

It will be observed also that the mouth of the spout body is curved. This provides what is sometimes called the "drip ring" of the spout.

While this invention has been shown and described in certain particular arrangements especially for illustration and explanation, it will be apparent that the invention may be set forth in other and widely varied organizations, all within the scope of this invention.

What is claimed is:

1. A trajectory spout structure comprising first and second disks, and a plurality of curved screens downstream of said disks, the first disk having a plurality of apertures therethrough and a plurality of flexible projections on one face of said disk, the second disk having a plurality of apertures, said first and second disks being positioned adjacent to each other so that fluid pressure above a predetermined value applied to the first disk will distort the projections and restrict the flow of fluid through the apertures of the second disk, said screens being of a similar spherical or concaval configuration and pointed downstream.

2. A trajectory spout structure according to claim 1, including a plurality of flat parallel screens adjacent to each other and interposed between the second disk and the spherical or concaval screens.

3. A trajectory spout structure according to claim 1, said spout structure having a ledge against which the spherical or concaval screens are seated.

4. A trajectory spout structure for producing a trajectory stream of water over a path which is substantially unchanged notwithstanding changes in the pressure of the fluid supplied to the structure, comprising a pair of contiguous disks each having a plurality of apertures, one of the disks bearing a plurality of flexible projections which abut the adjacent face of the other disk, and a plurality of screens closely adjacent to each other and spherical or concaval in shape, and pointed downstream, said projections being compressed as the pressure of the fluid increases and being expanded as the fluid pressure recedes.

5. A trajectory spout structure according to claim 4, including a plurality of flat screens closely adjacent to each other and interposed between the contiguous disks and the spherical or concaval screens.

6. A trajectory spout structure according to claim 5, including also a conical screen positioned upstream of the contiguous disks.

7. A trajectory fluid flow device for producing a laminar stream of water which is retained within a substantially identical path within the basin of a lavatory notwithstanding changes in pressure above a predetermined value, comprising a pair of contiguous disks each having a plurality of apertures, one of the disks having a plurality of flexible projections which abut the adjacent surface of the other disk, said device having a plurality of tapered walls, the tapers of which are so shaped that the fluid flowing through the device will be directed towards the axis of the device, a ledge within said device, a plurality of semispherical or concaval screens which are seated against the ledge of the device and pointed downstream, said screens being near the exital opening of said device.

8. A trajectory fluid flow device according to claim 7 including a plurality of contiguous flat screens which are parallel to each other and interposed between the contiguous disks and the semispherical screens.

* * * * *